United States Patent [19]

Therrien

[11] Patent Number: 4,885,767

[45] Date of Patent: Dec. 5, 1989

[54] BLUE-BOX FRAUD PREVENTION

[75] Inventor: John L. Therrien, Ontario, Canada

[73] Assignee: Bell Canada, Quebec, Canada

[21] Appl. No.: 251,084

[22] Filed: Sep. 29, 1988

[30] Foreign Application Priority Data

Sep. 29, 1987 [CA] Canada ................................. 548073

[51] Int. Cl.[4] ........................................... H04M 1/66
[52] U.S. Cl. ................................... 379/189; 379/188
[58] Field of Search ..................... 379/189, 188, 34, 32

[56] References Cited

U.S. PATENT DOCUMENTS 4,001,513 1/1977 Naylor .
4,002,848 1/1977 Stein .
4,284,851 8/1981 Schweitzer et al. .

OTHER PUBLICATIONS

"Beating the Blue-Box Bandits", by Marce Eleccion, IEEE Spectrum, Aug. 1972, pp. 52-58.

Primary Examiner—James L. Dwyer
Attorney, Agent, or Firm—Wenderoth, Lind & Ponack

[57] ABSTRACT

Disclosed is a method and apparatus for detecting a fraudulent toll telephone call made by a device coupled to a telephone, which device can generate a single-frequency (SF) tone control signal and multi-frequency (MF) signals used in a toll telephone network. The method comprises the steps of, (a) identifying an off-hook condition on a toll analog SF trunk line by detecting loop current on the trunk, and (b) detecting on the trunk an SF tone control signal indicating an on hook condition, followed by a predetermined number of MF control signals. The fraudulent call can be cancelled by actuating a relay having contacts in at least one control lead of the SF trunk.

9 Claims, 1 Drawing Sheet

BLUE-BOX FRAUD PREVENTION

BACKGROUND OF THE INVENTION

This invention relates to a method and apparatus for detecting and preventing fraudulent toll telephone calls using a so-called "blue box".

Those skilled in the art are very familiar with blue boxes so that they need not be described here in detail. Briefly, however, a blue box is a device which a user can couple to a telephone and use to generate signals corresponding to control signals used by toll telephone networks. It can generate a single frequency (SF) tone, e.g. 2600 Hz, as well as multi-frequency (MF) tones. A fraud perpetrator calls a nearby or toll-free destination, thereby seizing a termination toll analogue SF link. He then uses his blue box to apply 2600 Hz tone which fraudulently signals the telephone equipment that the SF link has gone on-hook. Removal of the 2600 Hz signal causes a new seizure at the terminating office which then signals the caller to proceed. The fraud perpetrator then uses his blue box to send new MF digits and reach a new, usually distant, location. However, the telephone system billing equipment records the call as having been to the first caller destination so that the blue box user is not billed properly. For more information on blue boxes, reference may be had to the following:

| U.S. Pats. | | |
|---|---|---|
| 4,001,513 | Naylor | January 4, 1977 |
| 4,002,848 | Stein | January 11, 1977 |
| 4,284,851 | Schweitzer | August 18, 1981 |

Publication

"Beating the blue-box bandits" by Marce Eleccion, IEEE Spectrum, August 1972, pp. 52–58.

Various methods have been devised to try to frustrate or defeat people using blue boxes, such as those disclosed in the above mentioned references. For example the IEEE publication refers (but does not describe in detail) to equipment which detects the presence of an unusually long burst of 2600 Hz on a line and records the length of the call, as well as other data. Such a system can be used to gather evidence to prosecute users of blue boxes but not to prevent them from making fraudulent toll telephone calls.

In the arrangement disclosed by the above mentioned Naylor U.S. patent, fraudulent use is detected by detecting the presence of a second proceed-to-send signal at the originating office during any one toll call. The calling number may be identified by flagging the records of the message accounting system.

In the arrangement according to the above identified Stein U.S. patent, tone detectors are coupled to the connection at a point where in-band supervisory signals are not normally present. If a single frequency supervisory signal is detected, the call is presumed to be a fraudulent call and the connection is released. The Stein arrangement requires that all lines be scanned looking for the tones generated by the blue box.

In the arrangement disclosed in the above mentioned Schweitzer patent, near end switching equipment recognizes an improper sequence of supervisory signals and then monitors for MF tones. When the arrangement detects a fraudulent call in progress, it multilates the digit sequence which is transmitted by the blue box toward a destination toll office. The switching equipment at the destination toll office responds to the invalid digit sequence by routing the call to reorder in a conventional manner.

Another known method of combatting blue box fraud involves using routing and translation orders to have incoming trunks screened for foreign calls. These illegal calls are then blocked from dialling to non-allowed codes. Blocking the re-routing of calls limits the usefulness of the telephone system and is becoming more and more undesirable because of plans for new network management systems.

SUMMARY OF THE INVENTION

The present invention provides a relatively simple and inexpensive method and apparatus for preventing blue box fraud. Unlike the prior art, the apparatus of this invention can be connected on the completion side of a trunk and is thus not vulnerable to outside agencies using the network. The apparatus is essentially analogue rather than digital and can be placed on the outgoing or incoming side of a toll analogue SF trunk circuit.

In accordance with a broad aspect of the invention there is provided a method of detecting a fraudulent toll telephone call made by means of a device coupled to a telephone, which device can generate a single-frequency (SF) tone control signal and multi-frequency (MF) signals used in a toll telephone network, said method comprising the steps of:

(a) identifying an off-hook condition on a toll analog SF trunk line by detecting loop current on said trunk, and (b) detecting on said trunk an SF tone control signal indicating an on hook condition, followed by a predetermined number of MF control signals.

In accordance with another broad aspect of the invention there is provided apparatus for detecting a fraudulent toll telephone call made by means of a device coupled to a telephone, which device can generate a single-frequency (SF) tone control signal and multi-frequency (MF) signals used in a toll telephone network, said apparatus comprising:

(a) monitoring means for producing a first signal indicative of an off-hook condition on a toll analog SF trunk, (b) detection means activated in response to said first signal for detecting an SF tone control signal indicating an on hook condition and producing a second signal indicative thereof, (c) MF receiver means activated in response to said second signal for detecting MF control signals and, (d) switching means, responsive to receipt of a predetermined number of MF signals by said MF receiver, for effecting cancellation of said fraudulent call.

DESCRIPTION OF THE PREFERRED EMBODIMENT

Figure 1:
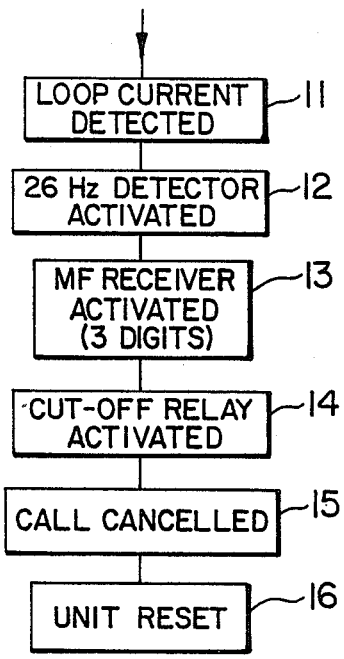
FIG. 1 is a diagram indicating the steps carried out by apparatus according to the invention.

Referring to FIG. 1, the method according to the invention involves, first, detection of an off-hook condition on a toll analogue SF trunk, by detecting loop current as indicated at block 11. Once loop current has been detected, a 2600 Hz detector is activated, block 12. This detector detects any 2600 Hz signal transmitted by a blue box to deceive the telephone company equipment into thinking that the caller has gone back on-hook. If 2600 Hz is detected by the detector, it activates an MF receiver, block 13 and once a predetermined number, e.g. 3, of MF signals (representing digits) has been received, a cut-off relay is activated, block 14. The activation of the cut-off relay causes the fraudulent call to be cancelled, block 15, and the unit is reset, block 16. The cut-off relay activates contacts in specific control leads of the trunk to drop the call, e.g. the sleeve lead or the E and M leads.

Figure 2:
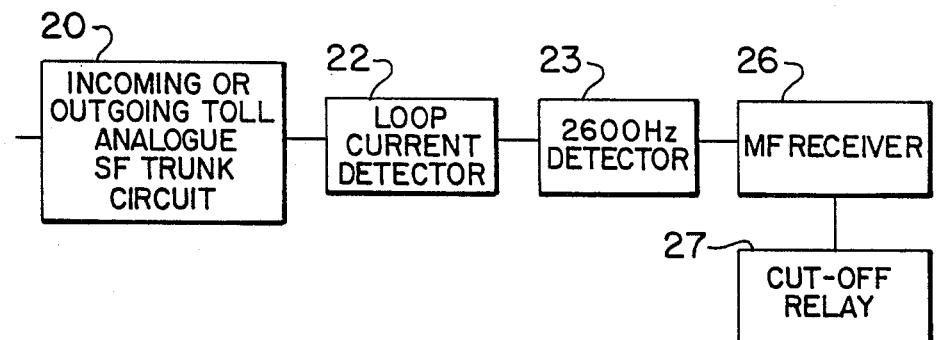
FIG. 2 is a block diagram of apparatus according to the invention.

Turning to FIG. 2, a call is received on a toll analog SF trunk circuit 20 and loop current is detected by a loop current detector 22 which then activates the 2600 Hz detector 23. If detector 23 detects a 2600 Hz signal produced by a blue box to indicate that the caller has gone on-hook, an MF receiver 26 is activated. When a predetermined number of MF signals have been detected, e.g. three, the MF receiver activates a cut off relay 27 to cancel the call.

To keep the apparatus small in size and inexpensive, the MF receiver is preferably an integrated circuit chip. These are available from various manufacturers.

If only 2600 Hz is detected, but no MF signals are received, the apparatus will not activate cancellation of the call; the call will proceed as a normal toll call. This protection is applied to prevent false activation of the unit due to voice band or carrier signals in the 2600 Hz range.

For total blue box control, apparatus according to the invention is required in each toll analouge SF trunk. One unit could, however, monitor more than one trunk by means of multiplexing under microprocessor control.

As indicated in block 20 of FIG. 2, the apparatus according to the invention may be connected at either the incoming or outgoing end of a toll analogue SF trunk circuit.

What I claim is:

1. A method of detecting a fraudulent toll telephone call made by means of a device coupled to a telephone, which device can generate a single-frequency (SF) tone control signal and multifrequency (MF) signals used in a toll telephone network, said method comprising the steps of:
   (a) identifying an off-hook condition on a toll analog SF trunk line by detecting loop current on said trunk, and
   (b) detecting on said trunk an SF tone control signal indicating an on hook condition, followed by a predetermined number of MF control signals.

2. A method as claimed in claim 1 and further comprising the step of effecting cancellation of said fraudulent call.

3. A method as claimed in claim 2 wherein said predetermined number is three.

4. A method as claimed in claim 3 wherein cancellation of said fraudulent call is effected by actuating a relay having contacts in at least one control lead of said SF trunk.

5. Apparatus for detecting a fraudulent toll telephone call made by means of a device coupled to a telephone, which device can generate a single-frequency (SF) tone control signal and multi-frequency (MF) signals used in a toll telephone network, said apparatus comprising:
   (a) monitoring means for producing a first signal indicative of an off-hook condition on a toll analog SF trunk,
   (b) detection means activated in response to said first signal for detecting an SF tone control signal indicating an on hook condition and producing a second signal indicative thereof,
   (c) MF receiver means activated in response to said second signal for detecting MF control signals and,
   (d) switching means, responsive to receipt of a predetermined number of MF signals by said MF receiver, for effecting cancellation of said fraudulent call.

6. Apparatus as claimed in claim 5 wherein said predetermined number is three.

7. Apparatus as claimed in claim 6 wherein said switching means comprises a relay having contacts in at least one control lead of said SF trunk.

8. Apparatus as claimed in claim 7 wherein said monitoring means is a loop current detector.

9. Apparatus as claimed in claim 7 wherein said MF receiver comprises an integrated circuit chip.

* * * * *